United States Patent
Boxer et al.

(10) Patent No.: US 9,893,812 B2
(45) Date of Patent: Feb. 13, 2018

(54) WIRELESS NETWORK CABLE ASSEMBLY

(71) Applicant: OFS Fitel, LLC, Norcross, GA (US)

(72) Inventors: Mark A Boxer, Pinetown, NC (US); John E George, Cumming, GA (US)

(73) Assignee: OFS FITEL, LLC, Norcross, GA (US)

( * ) Notice: Subject to any disclaimer, the term of this patent is extended or adjusted under 35 U.S.C. 154(b) by 10 days.

(21) Appl. No.: 15/082,178

(22) Filed: Mar. 28, 2016

(65) Prior Publication Data
US 2017/0126321 A1    May 4, 2017

Related U.S. Application Data

(60) Provisional application No. 62/250,134, filed on Nov. 3, 2015.

(51) Int. Cl.
*H04B 10/2575* (2013.01)
*H04W 88/08* (2009.01)

(52) U.S. Cl.
CPC .... *H04B 10/25753* (2013.01); *H04W 88/085* (2013.01)

(58) Field of Classification Search
CPC .. H04B 10/40; H04B 10/801; H04B 10/1143; G02B 6/4246; G02B 6/4292
See application file for complete search history.

(56) References Cited

U.S. PATENT DOCUMENTS

| | | | |
|---|---|---|---|
| 5,550,476 A * | 8/1996 | Lau | G01R 31/024 324/509 |
| 9,030,370 B2 | 5/2015 | Petrovic | |
| 9,196,956 B2 | 11/2015 | King et al. | |
| 2006/0153565 A1 | 7/2006 | Park et al. | |
| 2007/0248358 A1 | 10/2007 | Sauer | |
| 2013/0272696 A1* | 10/2013 | Palanisamy | H04B 10/25754 398/25 |
| 2014/0146906 A1* | 5/2014 | Zavadsky | H04B 7/022 375/267 |
| 2014/0340279 A1* | 11/2014 | Bayram | H01Q 1/248 343/861 |

OTHER PUBLICATIONS

Penze, Rivael S., et al., "Fiber Powered Extender for XG-PON/G-PON Applications", Optical Society of America, J. Opt. Commun. Netw./vol. 6, No. 3/Mar. 2014, pp. 250-258.

* cited by examiner

Primary Examiner — Ted Wang
(74) Attorney, Agent, or Firm — Wendy Kaba, Esq.

(57) ABSTRACT

An optical fiber-based cable is formed to include pre-manufactured wireless access nodes included at spaced-apart locations along a length of the optical fiber cable. Each wireless access node is formed to include an antenna, a wireless radio transceiver, and an optical transceiver. The cable is formed to include a plurality of optical transmission fibers, as well as a plurality of separate electrical power conductors. An optical fiber is terminated at the optical transceiver within the wireless node, and a power conductor from the cable terminates at the node and is used to energize both the wireless transceiver and the optical transceiver. The antenna is preferably formed as a sheathing member around at least a portion of components forming the node. Upon deployment, the wireless node portion of the cable is able to provide communication between the cable and wireless devices in its vicinity.

23 Claims, 8 Drawing Sheets

WIRELESS NETWORK CABLE ASSEMBLY

CROSS-REFERENCE TO RELATED APPLICATIONS

This application claims the benefit of U.S. Provisional Application Ser. No. 62/250,134, filed Nov. 3, 2015, and herein incorporated by reference.

TECHNICAL FIELD

The present invention relates to a wireless network cable assembly and, more particularly, to an optical fiber-based network cable formed to include, pre-manufactured wireless access nodes included at spaced-apart locations along a length of the optical fiber cable.

BACKGROUND

Within the domain of optical fiber-based communication networks, there is a constant discussion regarding various network architectures, often referred to as "FTTx", which stands for "fiber-to-the-x". The "x" may be "home" (FTTH), "curb" (FTTC), "node" (FTTN), etc. Recently, these competing architectures have been deployed to provide Gigabit per second connections to the ultimate end-user location (i.e., residence, office, or the like). Many providers are looking towards to the use of a FTTH configuration, installing optical fiber from a network "drop" all the way to each physical residence. However, costs for installing the last few hundred feet of fiber to each residence currently range from $300-$400 for the labor alone. It is also predicted that 5G networks will require the utilization of many small cell sites to supplement current macro-cell sites, in order to support the higher data rates to mobile users.

Thus, carriers would prefer a means for providing Gigabit connections to homes (or businesses; in generally, "end-user locations") without the need to install fiber to the actual location, as well as a means to quickly and easily install small cells, providing such capacity quickly and with low cost, while not requiring specialized technicians to install the service. Future "5G" technologies may enable Gigabit wireless data rates within a range of about 100-500 meters, lending support to finding a way to use wireless connections for this last connection between end users and the network.

It is known that network RF wireless data rates drop in proportion to increased distance between the network-connected RF of the antenna and the end user wireless device. As mobile devices continue to proliferate and applications continue to require increasing data rates, service providers need to deploy sufficient wireless transceivers and antennas closer to the end user locations, so as to deliver acceptable data rates to the consumers. In most of today's configurations, wireless network components are deployed as stand-alone components, consisting of cables, wireless transceivers and antennas; these various components are then assembled in the field to meet the requirements of a particular installation. This process is time-consuming and requires multiple skills by field technicians to properly handle, install, and connect power conductors, optical fibers cables, wireless transceivers, and antenna components.

There are a variety of known arrangements describing the combination of optical fiber and power conductors in a single cable sheath. In these arrangements, the included power conductors may be used for monitoring applications, systems testing, and the like. However, these configurations are not used as also a source of wireless communication. To provide wireless network services to the same group of subscribers, the necessary wireless components are provided as separate piece parts (or sub-assemblies) and need to be field-assembled and field-connected into the desired network service area.

SUMMARY OF THE INVENTION

The needs remaining in the art are addressed by the present invention, which relates to a wireless network cable assembly and, more particularly, to an optical fiber-based cable formed to include pre-manufactured wireless access nodes included at spaced-apart locations along a length of the optical fiber cable.

In accordance with the present invention, a series of wireless access nodes are preferably incorporated into an optical fiber cable during assembly, with a determined span distance (or distances) created between wireless nodes in a given link. In particular, each wireless access node is formed to include an antenna, a wireless radio transceiver, and an optical transceiver. The cable is formed to include a plurality of optical transmission fiber cables, as well as a plurality of separate electrical power conductors. An optical fiber is terminated at the optical transceiver within the wireless node, and a power conductor from the cable terminates at the node and is used to energize both the wireless transceiver and the optical transceiver. In some cases, a power transformer is included in the embedded wireless node and used to control the voltage applied as an input to these transceivers. Alternatively, optical fiber(s) may be used to provide power to transceivers in low power applications. The antenna is preferably formed as a sheathing member around at least a portion of components forming the node. The node is enclosed within a housing that serves to integrate the node with the cable. Upon deployment, the wireless node portion of the cable is therefore able to provide communication between the cable and wireless devices in its vicinity.

In one embodiment, a single antenna is included within the node. Alternatively, multiple antennas (each having a different directionality or operating at a different frequency) may be included within the wireless node to form a multi-sector configuration. In this case, the wireless radio transceiver is configured to send and receive messages at all of the various frequencies utilized by the antennae.

One configuration of a wireless node-equipped optical fiber cable of the present invention may be used in a FTTN network, bringing wireless communications to individual end point locations downstream of an optical communication and power node. In another configuration, the inventive optical fiber cable may be deployed in an "indoor" installation, such as within an office building or residential location to provide wireless access to various locations within the structure.

A plurality of wireless node-embedded optical fiber cables may be concatenated in series to provide wireless communication service to a longer span of endpoints all service by the same optical communication and power node.

While a preferred embodiment of the present invention takes the form of a cable having factory-installed wireless nodes disposed at locations along the span of the cable, it is also possible to include one or more of these nodes within a cable subsequent to its manufacture.

One specific embodiment of the present invention takes the form of a 1. An optical fiber communication cable comprising a plurality of optical fibers disposed in an axial direction along a signal path, the plurality of optical fibers including a fronthaul communication fiber for supporting bidirectional optical communication, a plurality of electrical power conductors disposed in the axial direction along the signal path and at least one embedded wireless access node disposed at a predetermined location along the signal path. The embedded wireless access node functions as a termination for an optical fiber from the plurality of optical fibers and a power conductor from the plurality of electrical power conductors and includes the following components: an antenna, a wireless radio transceiver coupled to the antenna and powered by the terminated electrical power conductor (the wireless radio transceiver providing bidirectional communication with wireless devices within range of the antenna and converting communications between radio signals and electrical signals), and an optical transceiver coupled to the terminated optical fiber and the fronthaul optical fiber (the optical transceiver powered by the terminated electrical power conductor and connected to the wireless radio transceiver for providing bidirectional communication with the wireless radio transceiver and converting communications between electrical signals and optical signals, with converted optical signals coupled onto the fronthaul communication fiber).

Other and further embodiments and advantages of the present invention will become apparent during the course of the following discussion and by reference to the accompanying claims.

BRIEF DESCRIPTION OF THE DRAWINGS

Referring now to the drawings, where like numerals represent like parts in several views.

DETAILED DESCRIPTION

Figure 1:
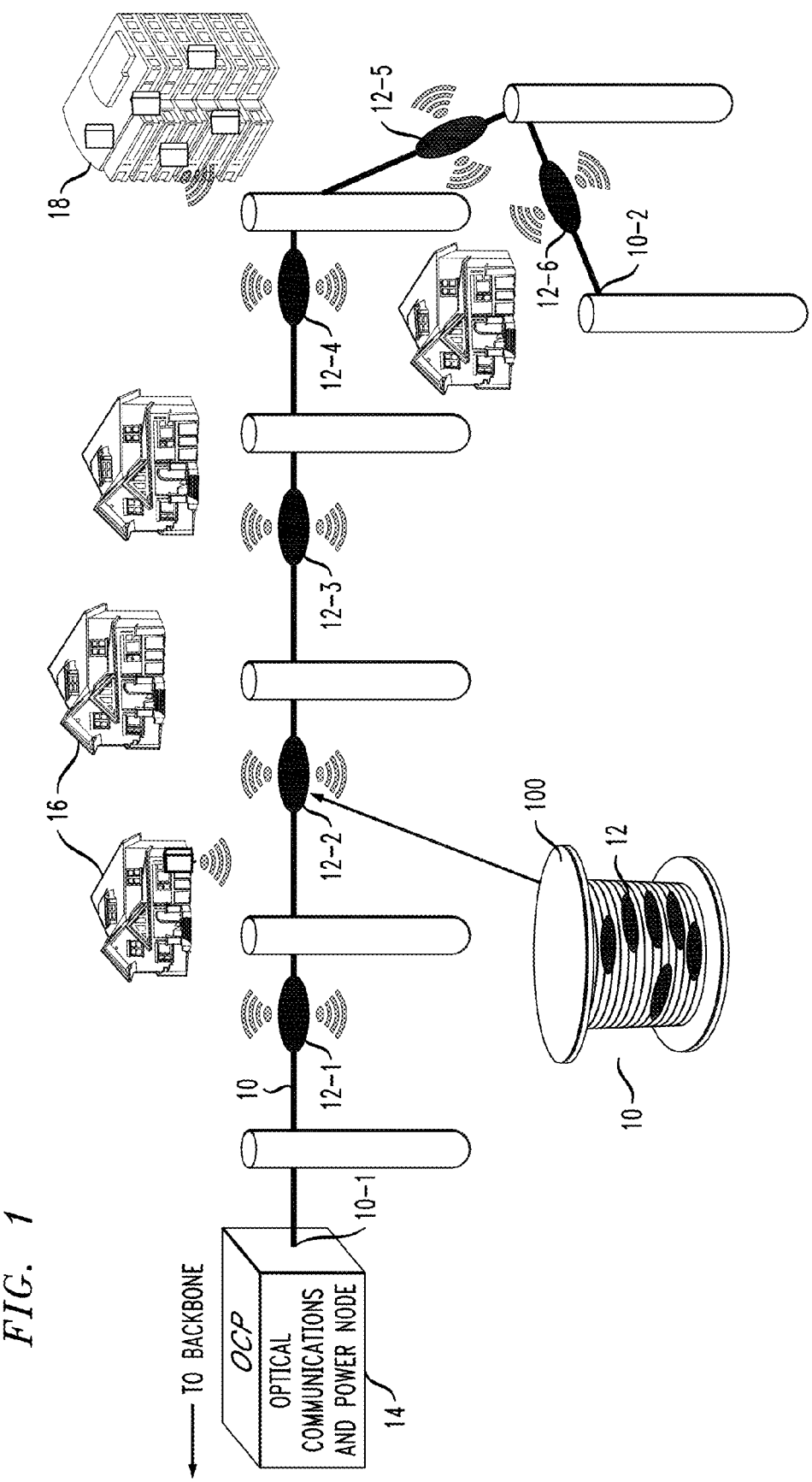
FIG. 1 illustrates an exemplary installation of an optical fiber cable including embedded wireless nodes in accordance with the present invention.

FIG. 1 illustrates an exemplary "fiber-to-the-wireless node" (FTT-WN) architecture that may utilize a wireless node-embedded optical cable 10 formed in accordance with the present invention to provide the "last mile" communication link between an optical communication network and a local group of separate end users (and also various mobile wireless devices within range of one of the embedded nodes). In this simplified diagram, optical cable 10 is shown as a type of "distribution" cable from an optical communications and power (OCP) node 14, where OCP node 14 may be located at the entrance to a neighborhood, along a city street, in a building, or the like. Although not shown, it is understood that OCP node 14 is connected to the backbone communications network and provides bi-directional communication with this backbone network. In this particular example, optical cable 10 is manufactured to include a net of six separate embedded wireless nodes 12, disposed in a spaced-apart configuration along optical cable 10 from a first termination 10-1 at OCP node 14 to a second termination 10-2 at a utility pole (this termination may also be between utility poles). Wireless nodes 12 may be disposed at regular intervals along cable 10, or with any other required spacing being adjacent nodes, as dictated by a specific configuration where the cable is to be installed.

Although the example shown is an "aerial" deployment, an embodiment of the present invention may also be included within an underground cable. A reel 100 of this inventive wireless node-embedded optical fiber cable 10 is also shown in FIG. 1. Indeed, one advantage of the utilization of embedded wireless nodes formed in accordance with the present invention is that they may be disposed coaxially along the direction of the cable, allowing for the structure to be wound on a reel for shipment and storage purposes.

As will be discussed in detail below, each embedded wireless access node is formed to include a wireless antenna, a wireless radio transceiver, and an optical transceiver. An electric power conductor running through optical cable 10 is used to energize the components of each wireless embedded node 12, and an optical fiber running through optical cable 10 is used to support the "fronthaul" (i.e., upstream and/or downstream) communication between each embedded wireless node 12 and OCP node 14.

Operating as a conventional wireless access point, the antenna within node 12 broadcasts its operating frequency within a geographic area that is accessible by the various residences 16 and office buildings 18 in the vicinity of that particular node 12 (i.e., "fixed-location wireless communication devices"), receiving wireless communications from mobile devices in its vicinity. Thus, each fixed-location residence is able to communicate via a wireless connection with the FTT-WN network, with the components in node 12 converting the received electrical communication signal into an optical signal for transmission upstream along the fronthaul communication fiber (and, conversely, converting incoming optical signals into wireless radio signals to be transmitted to the wireless end-users).

Rather than relying on the need to install optical fiber to each fixed-location residence 16 and building 18, the architecture of the present invention utilizes a plurality of embedded wireless access nodes 12 that are included at various locations along optical cable 10. These wireless access nodes 12 may be embedded within optical cable 10 during its manufacture, allowing for the deployment of a single FTT-WN cable 10 to communicate with all wireless devices in a geographic area (either fixed or mobile) without the need to include any cabling to the endpoints, or the need to install equipment at the fixed-location residences or businesses.

Figure 2:
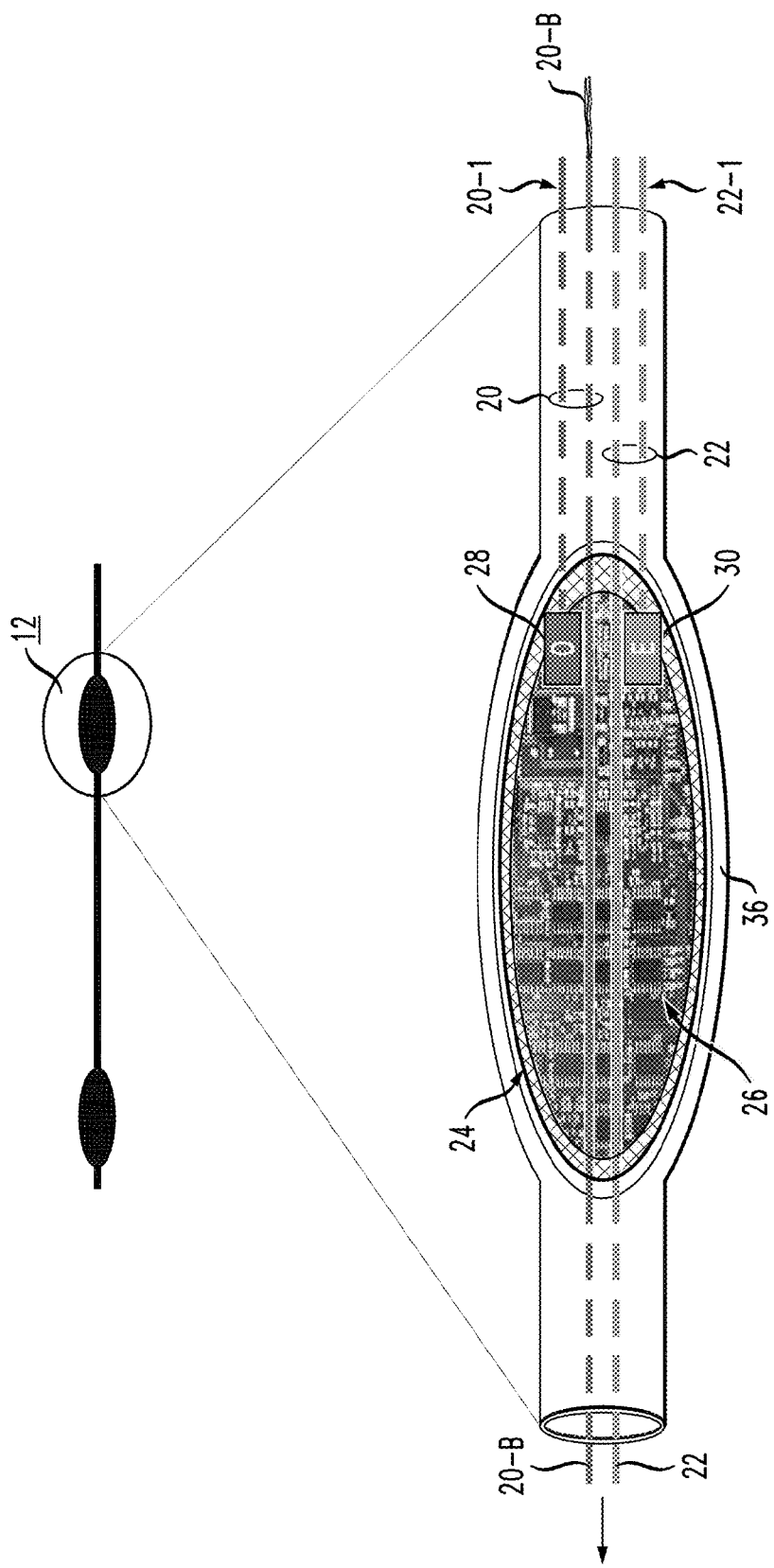
FIG. 2 is a cut-away side view of an exemplary wireless node formed in accordance with the present invention.

FIG. 2 is a cut-away side view of an exemplary embedded wireless node 12 as constructed within optical fiber cable 10. In accordance with the present invention, wireless node 12 is formed to include a wireless antenna 24 that is used to broadcast RF signals in the local proximity of node 12, as well as receive RF signals from wireless devices in use within the range of node 12. Wireless antenna 24 is coupled to a wireless radio transceiver 26 included within node 12, where wireless radio transceiver is in turn connected to an optical transceiver 28 disposed in node 12. In this particular embodiment, an electrical power transformer 30 is included and used to supply electrical power to both wireless radio transceiver 26 and optical transceiver 28.

As mentioned above (and discussed in detail below in association with FIG. 5), optical fiber cable 10 includes electrical conductors that energize the components within each embedded wireless node 12 (and may also serve other purposes of bringing electrical control and/or signaling within optical cable 10 as well-known in the art). Separate optical fibers included within cable 10 are used to create a separate optical communication link to each embedded wireless node, as well as provide an upstream signal path back to OCP 14. As mentioned above, the included optical fibers could potentially be used for power transmission in a low-power configuration.

In the particular embodiment as shown in FIG. 2, a plurality of optical fibers 20 is shown as passing through this particular node 12, where a first optical fiber 20-1 is shown as coupling to optical transceiver 28. One of the remaining optical fibers is designated as fronthaul optical fiber 20-B, used to transmit upstream communication to OCP 14. The remaining fibers within the plurality of optical fibers 20 by-pass this particular node and pass along cable 10 to connect to the remaining downstream embedded wireless nodes (also shown in FIG. 5). Similarly, there are several electrical power conductors 22 that pass along through cable 10, where a first cable 22-1 is shown as coupling to electrical power transformer (or termination) 30. The remaining conductors continue on along cable 10 to be terminated within one of the remaining wireless nodes along the span.

In operation, electrical power transformer 30 energizes wireless radio transceiver 26 to initiate the broadcast of an RF signal via antenna 24 (exemplary integrated circuit device 27 used to provide the actual communication). Wireless communication devices in the vicinity of node 12 can respond to the RF signal and begin to communicate with the backbone network (not shown) via embedded wireless node 12. In particular, signals from the wireless devices are captured by antenna 24 and coupled into wireless radio transceiver 26. The radio signals are converted (via integrated circuits 27, for example) into an electrical signal format within transceiver 26, which then forwards the electrical signals as an input to optical transceiver 28. Optical transceiver 28, in turn, converts the electrical signal into optical form and couples the optical signal into fronthaul optical fiber 20-B for upstream transmission back to OCP node 14. It is to be understood that various specific configurations may be used in the implementation of both wireless radio transceiver 26 and optical transceiver 28, where these configurations are well-known to those skilled in the art and need not be discussed in detail in order to understand the subject matter of the present invention.

Figure 3:
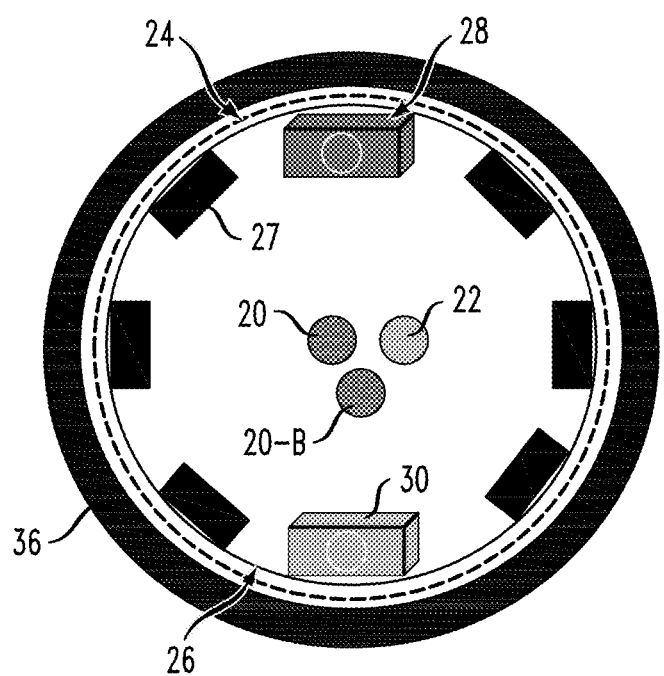
FIG. 3 is a cut-away end view of the node of FIG. 2, particularly illustrating the location of the "pass-through" optical fibers and electrical power conductors with respect to the wireless access node components.

FIG. 3 is a cut-away end view of node 12, which in this case illustrates the use of a flexible integrated circuit board as a substrate for wireless radio transceiver 26. The ability to bend wireless radio transceiver 26 so as to encircle a portion of node 12 facilitates the ability to form embedded wireless node 12 as a relatively small component (although it is to be understood that a bendable transceiver is not specifically required). Also evident in this view is that RF antenna 24 is formed as a wire mesh that completely encircles the remaining components (this specific configuration of an RF antenna is exemplary only; various other arrangements for co-located RF antennas may be used). By-pass optical fibers 20 (including fronthaul optical fiber 20-B) and by-pass power conductors 22 are shown as being disposed in a central region of node 12, removed from the interconnected components forming embedded wireless access node 12.

Figure 4:
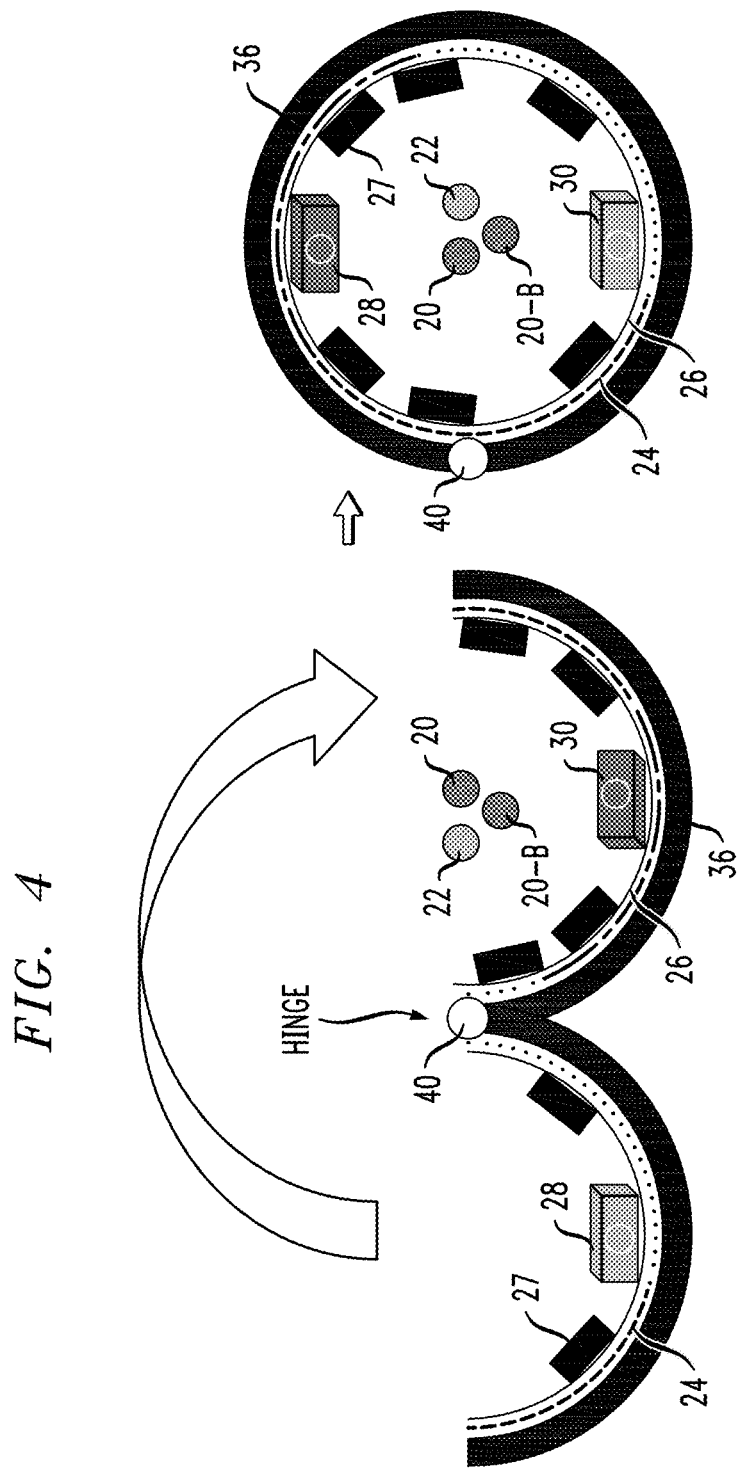
FIG. 4 illustrates one exemplary type of enclosure useful for installing a wireless access node along an optical fiber cable.

As mentioned above, one advantage to the utilization of embedded wireless nodes within an optical cable assembly is the ability to pre-manufacture a standard or engineered FTT-WN cable to include these nodes. FIG. 4 shows one exemplary construction arrangement where a clam-shell type of enclosure 36 is used to encase embedded wireless node 12. A hinge 40 is used to allow for ingress to node 12, opening along one side to expose the interior of node 12. The various components of the wireless access node are then installed within the opened enclosure, and the connections are made to optical fibers 20-1, 20-B and power conductor 22-1. Again, it is to be noted that the type of enclosure for the node is not limited to this clam-shell type of configuration. As long as the enclosure includes space to make both fiber and power splices (or support connector ports for these connections), any suitable type of housing may be employed. Indeed, the connector ports for both the optical and electrical connections may be included either inside or outside of the enclosure.

Once the assembly is complete, enclosure 36 is closed (via hinge 40) and may be sealed to prevent moisture, debris, etc. from entering node 12.

Figure 5:
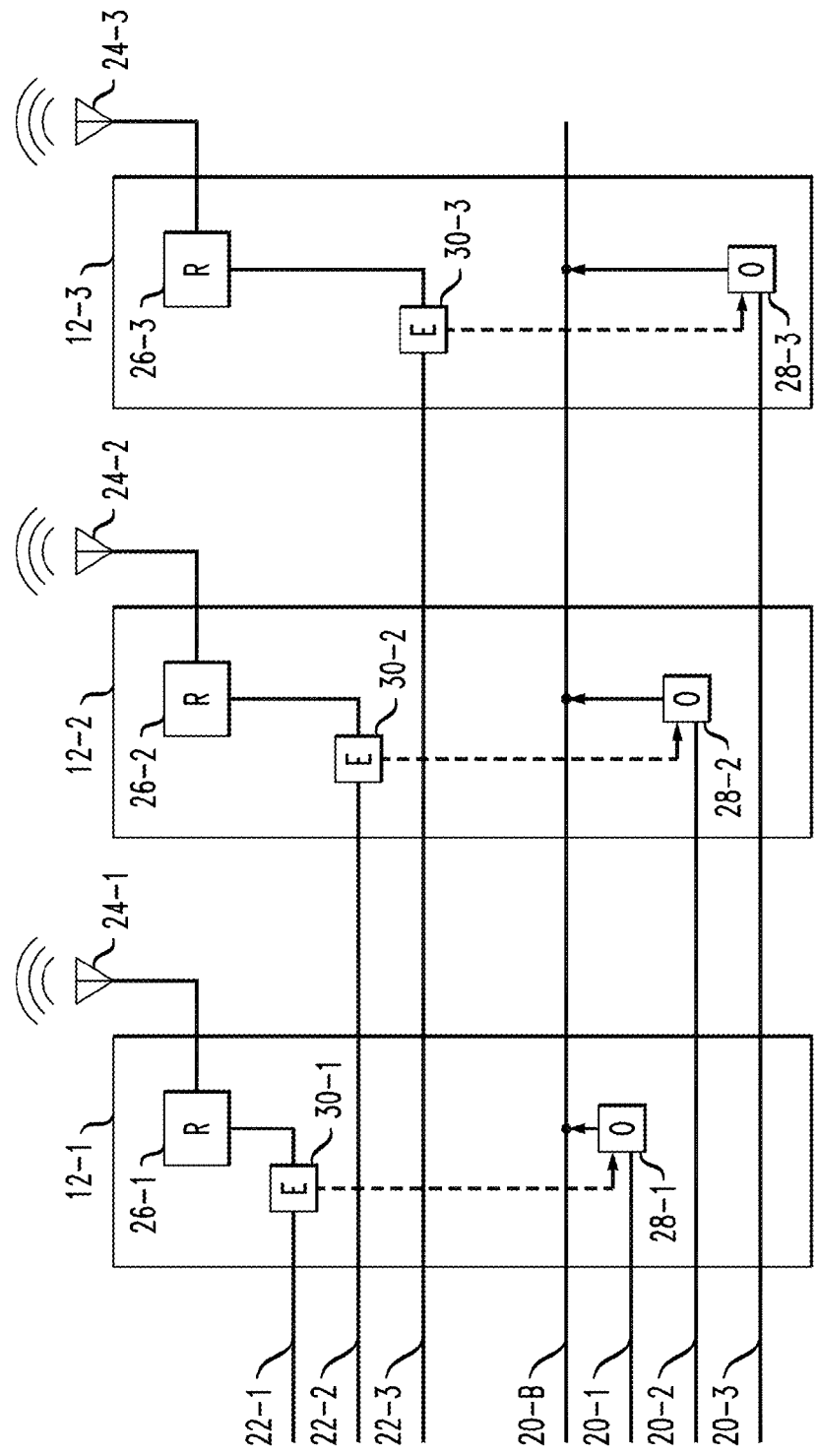
FIG. 5 is a simplified diagram of a set of three embedded wireless nodes, showing the terminations of various optical fibers and power conductors within each node.

FIG. 5 is a simplified block diagram depicting the deployment of a set of three such embedded wireless nodes 12-1, 12-2, and 12-3 along optical fiber cable 10. FIG. 5 illustrates the particular connections of the various fiber cables and power conductors contained within cable 10 to each separate wireless node. That is, each wireless node is shown as having a separate power conductor connection, shown as connections 22-1, 22-2 and 22-3. A separate optical fiber contained within cable 10 is used as an input fiber to each optical transceiver, where these fibers are shown as 20-1, 20-1, and 20-3 in FIG. 5 (the power circuit shown within the node is exemplary only, various other circuits may be used). Also shown in FIG. 5 is fronthaul optical fiber 20-B, used to provide the upstream communication from the various wireless end users to the backbone network.

Figure 6:
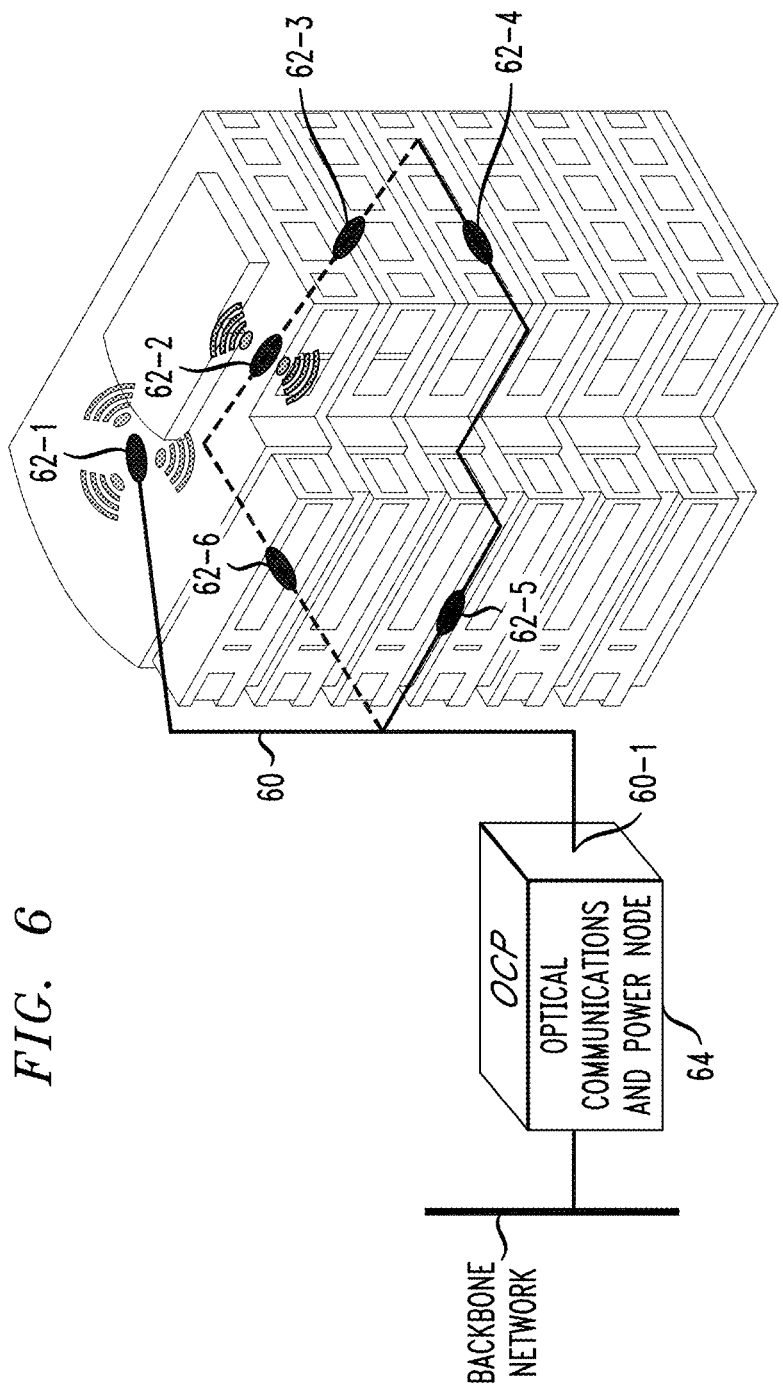
FIG. 6 illustrates an alternative type of installation for a wireless node-embedded optical fiber cable formed in accordance with the present invention, particularly showing an in-building or build-wrap deployment configuration.

Each wireless node is properly disposed along a section of optical cable 10 (for example, as shown in FIG. 1) so that wireless devices within the range of its RF signal can communicate with that node. In another embodiment, FIG. 6 illustrates a use of the inventive optical cable within (or around the exterior as a type of "wrapping") a building structure. Here, an optical cable 60, including a plurality of spaced-apart embedded wireless access nodes 62 is disposed so as to distribute the embedded wireless access nodes at various locations within (or "on") a building. As before, a first end termination 60-1 of cable 60 is coupled to an OCP node 64 (part of a larger FTTx network).

Figure 7:
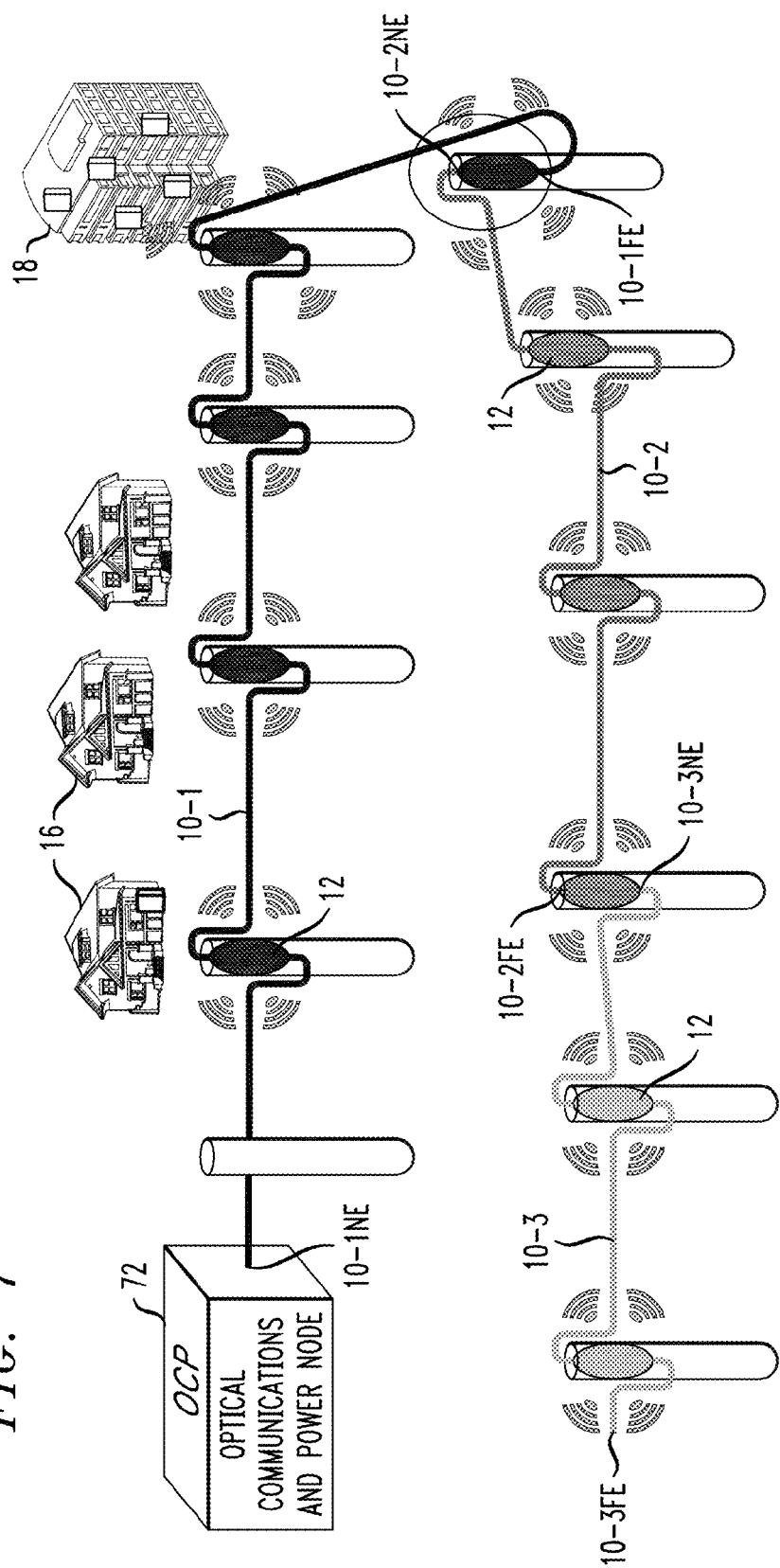
FIG. 7 is a diagram illustrating the formation of an optical communication network utilizing a concatenated set of optical fiber cables, each including one or more embedded wireless access nodes formed in accordance with the present invention.

It is possible to connect a set of these inventive cables together to extend the length of a span connected to a single OCP node. FIG. 7 illustrates an exemplary embodiment where a set of three separate cables 10-1, 10-2, and 10-3 are connected together in series to provide this architecture. In this configuration, the set of fronthaul fibers are spliced (or otherwise mated) together in series, with a connection also made between a power conductor in one span with a power conductor in a subsequent span. A near-end termination 10-1NE of first optical fiber cable 10-1 is shown as coupled to a local OCP node 72. The opposing far-end termination 10-1FE of cable 10-1 is coupled to a near-end termination (denoted 10-2NE) of second optical fiber 10-2. Similar connections are made between optical fiber cables 10-2 and 10-3. In this exemplary aerial configuration, the various embedded wireless nodes 12 are shown as disposed in an orthogonal orientation with respect to the axial direction of cable 10.

Figure 8:
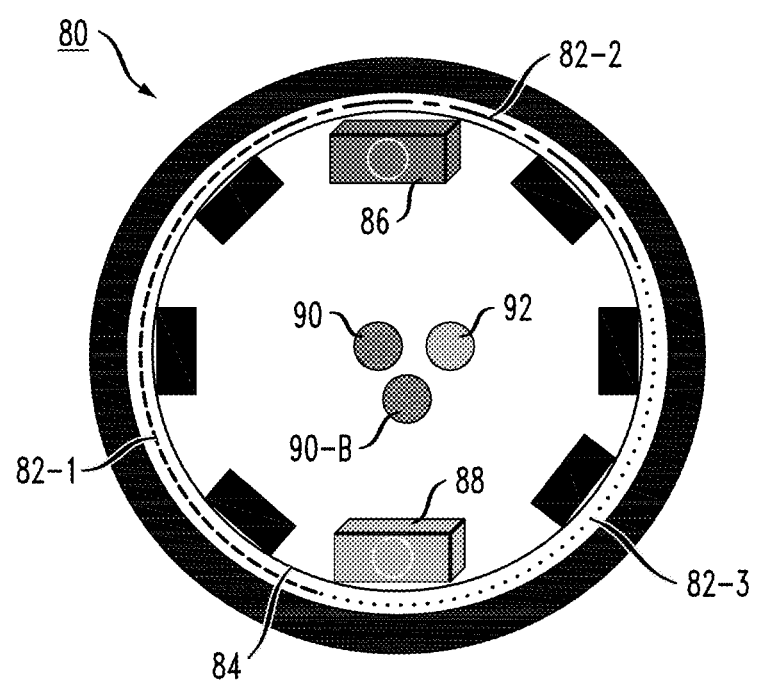
FIG. 8 is a cut-away end view of an alternative embodiment of the present invention, in this case including a set of three antennas (operating at different frequencies) within the inventive wireless access node.

As mentioned above, it is possible to configure a wireless node in accordance with the present invention that utilizes multiple frequencies and/or multiple beams (oriented in different directions) to support communication with wireless devices. FIG. 8 is a cut-away end view of an exemplary embedded wireless node 80 that is configured to include a set of three wireless sectors. In particular, node 80 includes a set of three RF antennas 82-1, 82-2 and 82-3, disposed to encircle node 80 in the manner shown. A first RF antenna 82-1 is indicated by the dashed line in FIG. 8, a second RF antenna 82-2 is indicated by the dash-dot line in FIG. 8, and a third RF antenna 82-3 is indicated by the dotted line in FIG. 8. A wireless radio transceiver 84 is properly configured to provide bidirectional communication for all three frequencies (or beams), and is coupled to an optical transceiver 86 which is used in the same manner as described above to pass the communications along an included fronthaul optical fiber 90-B. An electrical power transformer 88 (or termination, as the case may be) is also shown within wireless access node 80. As with the above-described embodiment, by-pass optical fibers 90 and by-pass power conductors 92 are disposed in a central region of node 80.

Advantageously, the wireless node-embedded optical cable of the present invention can be used independently of any wireless network protocol or frequency, and can be applied to cellular, macro, micro, or small cell networks, wifi networks, distributed antenna systems, or other network architectures based upon wireless communications. The optical fibers can be single mode or multimode standard telecommunications grade optical fibers, for example including but not limited to those compliant with ITU-T recommendation G.652 or G.657, or IEC-60793-2, including but not limited to silica optical fibers with a nominal cladding diameter of 125 microns and polymer-coated nominal diameter of 200-250 microns. The optical fibers may be packaged inside buffer tubes (which may be gel-filled), or tight buffered, or disposed in flat or rollable ribbons.

The power conductors may be comprised of copper, aluminum, or any other suitable electrically-conductive material, for example but not limited to, copper conductors of 4 to 24 gauge, so as to meet powering requirements for multiple nodes, with each node including the electrically-powered wireless radio transceiver and the electrically-powered optical transceivers as described above, with the wireless nodes placed along the cable at various pre-determined distances from a an optical communications and power (OCP) node. The power conductors may be composed of either stranded or solid conductors.

Depending on the power and communications fronthaul requirements, the optical fiber and power conducting strands may be connected either in series or in parallel with the nodes. Separate strands with the purpose of serving as antennae, may be deployed either stranded in a helical or "S-Z" manner around the core of the cable, or longitudinally along the axial length of the cable, or within the node, either inside or embedded in the outer sheath. The outer sheath may be made of common jacketing materials used in indoor, indoor/outdoor, or outdoor environments, such as polyethylene or PVC.

The cable itself may include strength members to limit the elongation of the metallic components and fibers to industry-appropriate strain levels to meet commonly-accepted reliability requirements. The cable also includes well-known components required to enable installation and long-term reliable operation to occur including, but not limited to, components to handle "crush", impact and long-term environmental exposure.

The wireless transceiver may be an existing or new design operating in any available licensed or unlicensed frequency band, supporting but not limited to 802.11 Wifi, 802.16 WiMax, or any release of LTE or "5G" or further technology, and may employ multiple-in-multiple-out (MIMO) and/or orthogonal frequency division multiplexing (OFDM) technology. The wireless transceiver may be mounted on a flexible circuit board that may be bent to a radius of about 3" or less to enable the circuit board to fit in and be factory assembled inside the node package.

The optical transceiver may be, but is not limited to, a 1000BASE-BX small form pluggable transceiver that supports bi-directional 1 Gbit per second transmission and reception on a single transmission fiber between the node and the hub, a 1000BASE-SX small form pluggable transceiver that supports duplex 1 Gbit per second transmission and reception on a pair of OM4, OM3, OM2, or OM1 multimode transmission fibers between the node and the hub, or a 10GBASE-BXU or 10GFRONTHAULBASE-BXU small form pluggable transceiver which supports bi-direction 10 Gbit per second transmission and reception on a single transmission fiber between the node and the hub, a 10GBASE-SR small form pluggable transceiver that supports duplex 10 Gbit per second transmission and reception on a pair of OM4, OM3, OM2, or OM1 multimode transmission fibers between the node and the hub.

Within the node, the connection or connections between the transmission fiber and optical transceiver may be in the form of a fusion splice to the optical transceiver pigtail, or optical connector directly mounted, fusion spliced, or mechanically spliced to the transmission fiber, with the optical connector plugged into the optical transceivers-compatible optical receptacle. The included copper wires may be in the form of traditional terminal blocks or lugs.

The entire finished assembly may be packaged on a reel (as shown in FIG. 1) to facilitate safe and effective transport to the installation location, where an additional advantage of the embedded, in-line wireless node is that it facilitates in-field deployment by tradespeople with limited technical training.

What is claimed is:
1. An optical fiber communication cable comprising:
a plurality of optical fibers disposed in an axial direction along a signal path, the plurality of optical fibers including a set of optical fibers for supporting downstream communication with a set of access nodes and a fronthaul communication fiber for supporting upstream optical communication from the set of access nodes;
a plurality of electrical power conductors disposed in the axial direction along the signal path; and
at least one embedded wireless access node disposed at a predetermined location along the signal path, the at least one embedded wireless access node functioning as a downstream access node termination for an optical fiber from the set of optical fibers, with a power conductor from the plurality of electrical power con- ductors coupled to the wireless access node for providing electrical power thereto, the embedded wireless node comprising an antenna;

a wireless radio transceiver coupled to the antenna and powered by the coupled electrical power conductor, the wireless radio transceiver providing bidirectional communication with wireless devices within range of the antenna and converting communications between radio signals and electrical digital data signals;

an optical transceiver coupled to the associated downstream optical fiber and powered by the coupled electrical power conductor, the optical transceiver connected to the wireless radio transceiver for providing bidirectional communication with the wireless radio transceiver and converting communications between electrical digital data signals and optical digital data signals, and an output optical fiber coupled between the optical transceiver and the fronthaul upstream communication fiber for coupling the converted optical digital data signals onto the fronthaul upstream communication fiber.

2. The optical fiber communication cable as defined in claim 1, wherein the at least one embedded wireless access node comprises a plurality of embedded wireless access nodes, disposed in a spaced-apart arrangement along a span of the optical fiber communication cable.

3. The optical fiber communication cable as defined in claim 2 wherein the spacing between adjacent wireless access nodes of the plurality of embedded wireless access nodes is essentially the same.

4. The optical fiber communication cable as defined in claim 2 wherein different spacings are used between adjacent embedded wireless access nodes of the plurality of embedded wireless access nodes, the different spacings associated with wireless devices within range of each wireless access node.

5. The optical fiber communication cable as defined in claim 2, wherein at least one group of embedded wireless access nodes is installed within the optical fiber communication cable during assembly.

6. The optical fiber communication cable as defined in claim 2, wherein at least one embedded wireless access node is installed during deployment of the optical fiber communication cable.

7. The optical fiber communication cable as defined in claim 2 wherein the optical fiber communication cable is disposed along an aerial installation for utilization with a plurality of fixed location wireless devices, the location of each embedded wireless access node based upon geographic location of the plurality of fixed location wireless devices.

8. The optical fiber communication cable as defined in claim 7 wherein one or more of the plurality of embedded wireless access nodes are configured to be attached to utility poles.

9. The optical fiber communication cable as defined in claim 7 wherein one or more of the plurality of embedded wireless access nodes are configured to be coaxial with the communication cable and disposed at locations between utility poles.

10. The optical fiber communication cable as defined in claim 2 wherein the optical fiber communication cable is disposed as an underground installation.

11. The optical fiber communication cable as defined in claim 2 wherein the optical fiber communication cable is disposed within a building as an interior wireless access network.

12. A wireless access node for utilization within an optical fiber communications cable including a set of downstream optical fiber and a single upstream fronthaul optical fiber, the wireless access node comprising an antenna;

a wireless radio transceiver coupled to the antenna and powered by energy from a connected electrical power conductor, the wireless radio transceiver providing bidirectional communication with wireless devices within range of the antenna and converting communications between radio signals and electrical digital data signals; and an optical transceiver coupled to a terminated downstream optical fiber and the upstream fronthaul optical fiber, the optical transceiver powered by the connected electrical power conductor and connected to the wireless radio transceiver for providing bidirectional communication with the wireless radio transceiver and converting communications between electrical digital data signals and optical digital data signals; and an output optical fiber coupled between the optical transceiver and the fronthaul upstream communication fiber for coupling the converted optical digital data signals onto the fronthaul upstream communication fiber.

13. The wireless access node as defined in claim 12 wherein the wireless access node further comprises a hinged clam-shell housing for enclosing the antenna, the wireless radio transceiver and the optical transceiver.

14. The wireless access node as defined in claim 13 wherein the wireless radio transceiver is supported on a flexible substrate for facilitating enclosure within the hinged clam-shell housing.

15. The wireless access node as defined in claim 12, wherein the antenna comprises a multi-sector antenna.

16. The wireless access node as defined in claim 15, wherein the multi-sector antenna comprises a multi-frequency antenna.

17. The wireless access node as defined in claim 15, wherein the multi-sector antenna comprises a multi-beam antenna.

18. The wireless access node as defined in claim 12, wherein the antenna comprises a multiple-in multiple-out (MIMO) antenna.

19. The wireless access node as defined in claim 12, where the access node further comprises a power transformer coupled to the electrical power conductor and used to provide corrected power level inputs to the optical transceiver and the wireless radio transceiver for energizing both components.

20. The wireless access node as defined in claim 12, wherein the access node utilizes an optical fiber to provide lower power electrical input to the wireless radio transceiver and the optical transceiver.

21. A fiber-to-the-wireless node communication system comprising an optical communications and power node for communicating with a backbone communication network;

a plurality of fixed-location wireless communication locations within a defined geographic area; and a first optical fiber communication cable coupled to the optical communications and power node and distributed along the defined geographic area to communicate with the plurality of fixed-location wireless communication locations, the first optical fiber communication cable comprises a plurality of optical fibers disposed in an axial direction along a signal path, the plurality of optical fibers including a set of optical fibers for supporting downstream communication from the optical communications and power node to a set of access nodes and a fronthaul communication fiber for supporting upstream optical communication from the set of access nodes to the optical communications and power node;

a plurality of electrical power conductors disposed in the axial direction along the signal path and receiving electrical power from the optical communications and power node; and a plurality of embedded wireless access nodes disposed at predetermined locations along the signal path based upon the spacing of the plurality of fixed-location wireless communication locations, each embedded wireless access node functioning as a downstream access node termination for an optical fiber from the set of optical fibers, with a power conductor from the plurality of electrical power conductors coupled to the wireless access node for providing electrical power thereto, each embedded wireless node comprising an antenna;

a wireless radio transceiver coupled to the antenna and powered by the coupled electrical power conductor, the wireless radio transceiver providing bidirectional communication with wireless devices within range of the antenna and converting communications between radio signals and electrical digital data signals;

an optical transceiver coupled to the associated downstream optical fiber and powered by the coupled electrical power conductor, the optical transceiver connected to the wireless radio transceiver for providing bidirectional communication with the wireless radio transceiver and converting communications between electrical digital data signals and optical digital data signals; and an output optical fiber coupled between the optical transceiver and the fronthaul upstream communication fiber for coupling the converted optical digital data signals onto the fronthaul upstream communication fiber.

22. The fiber-to-the-wireless node communication system as defined in claim 21, wherein the communication system further comprises a second optical fiber communication cable, coupled to an opposing end termination of the first optical fiber communication cable, so as to extend wireless communication to a set of fixed-location wireless communication locations, the second optical fiber communication cable comprising a plurality of optical fibers disposed in an axial direction along a signal path, the plurality of optical fibers including a set of optical fibers for supporting downstream communication with a set of access nodes and a fronthaul communication fiber coupled to the fronthaul communication fiber of the first optical fiber communication cable;

a plurality of electrical power conductors disposed in the axial direction along the signal path and receiving electrical power from the optical communications and power node; and a plurality of embedded wireless access nodes disposed at predetermined locations along the signal path based upon the spacing of the set of fixed-location wireless communication locations, each embedded wireless access node functioning as a downstream access node termination for an optical fiber from the set of optical fibers, with a power conductor from the plurality of electrical power conductors coupled to the wireless access node for providing electrical power thereto, each embedded wireless node comprising an antenna;

a wireless radio transceiver coupled to the antenna and powered by the coupled electrical power conductor, the wireless radio transceiver providing bidirectional communication with wireless devices within range of the antenna and converting communications between radio signals and electrical digital data signals;

an optical transceiver coupled to the associated downstream optical fiber and powered by the coupled electrical power conductor, the optical transceiver connected to the wireless radio transceiver for providing bidirectional communication with the wireless radio transceiver and converting communications between electrical digital data signals and optical digital data signals; and an output optical fiber coupled between the optical transceiver and the fronthaul upstream communication fiber for coupling the converted optical digital data signals onto the fronthaul upstream communication fiber.

23. The fiber-to-the-wireless node communication system as defined in claim 22 wherein the system further comprises additional optical fiber communication cables with embedded wireless access nodes concatenated in a series connection to the second optical fiber communication cable.

* * * * *